Dec. 23, 1952     F. G. SZAGER     2,622,689
POWER LAWN MOWER
Filed May 19, 1949
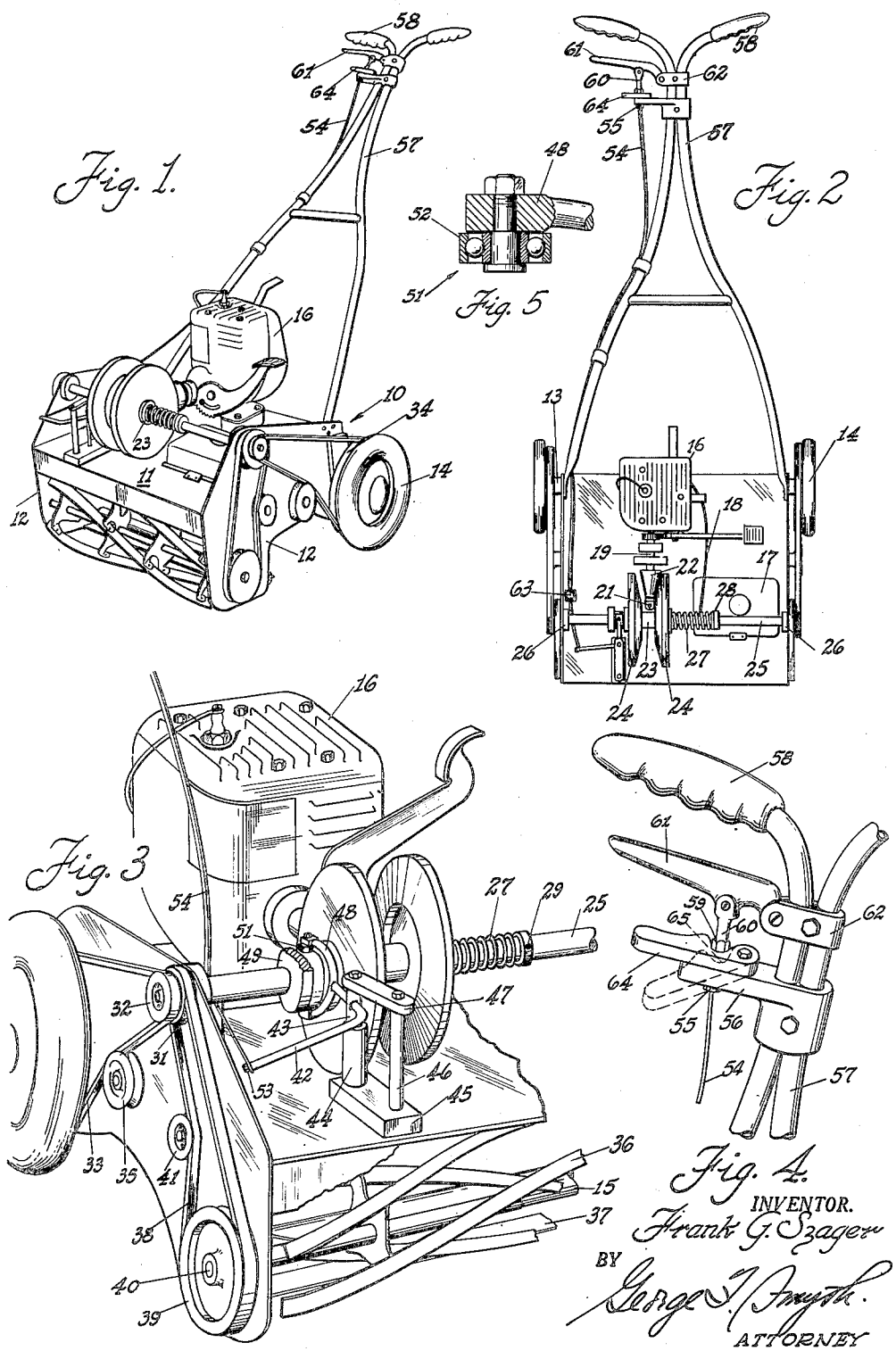
INVENTOR.
Frank G. Szager
BY
George J. Smyth
ATTORNEY Patented Dec. 23, 1952

2,622,689

UNITED STATES PATENT OFFICE 2,622,689

POWER LAWN MOWER

Frank G. Szager, Inglewood, Calif.

Application May 19, 1949, Serial No. 94,117

3 Claims. (Cl. 180—19)

This invention relates to lawn mowers, and more particularly to a motor driven lawn mower.

Power lawn mowers have been heretofore proposed, but these previously proposed mowers have not been widely used by the average home owner for several reasons. Prior power lawn mowers have generally been relatively heavy, cumbersome devices which were not easily maneuvered and were thus not adapted for use on relatively small lawns. Very few of the previously proposed mowers could be reversed and thus were extremely difficult to use where the lawn mower must be repeatedly reversed in use, as is the case on small lawns. Although reversible power lawn mowers have been proposed, the means for reversing the drive of the motor was relatively expensive and sometimes difficult to use.

The lawn mower of the present invention is particularly adapted for use by the average home owner having a relatively small lawn, for the mower is light in weight, relatively inexpensive, and includes means for not only disengaging the power source but for easily reversing the direction of travel of the mower as well.

An object of the invention is to provide a reversible lawn mower of very simple construction, the few working parts being inexpensive to produce and trouble free in operation.

A further feature of the invention is to provide control means comprising a single hand operated member which is moved only to one position to reverse the direction of travel of the lawn mower or held partway to said position by a detent to disconnect the power means from the transmission means of the mower.

Another object of the invention is to provide means whereby wear taking place in the forward and reverse mechanism of the power lawn mower may be very readily taken up by adjusting a single member.

Another feature of the mower of the present invention resides in the constructional arrangement of the cutting reel. This reel is mounted at the forward or front end of the frame and is therefore operative to shear off or cut grass lying closely adjacent to a building wall, flower bed, or the like.

Other features and advantages of the present invention will be readily apparent from the following description, particularly when taken in connection with the accompanying drawing, in which:

Figure 1 is a perspective view of the mower of the present invention;

Figure 2 is a top plan view of the mower;

Figure 3 is a fragmentary perspective view on an enlarged scale;

Figure 4 is a fragmentary perspective view on an enlarged scale of the shaft lever and its holding means; and Figure 5 is a fragmentary view in section showing the means of the bell crank lever engaging the hub carrying the spaced disks.

The mower of the present invention, referring now to the drawing, and more particularly to Figure 1 thereof, comprises a main frame 10 consisting of a bed plate 11 and a pair of side plates 12. The main frame 10 may be cast as an integral piece or if desired the bed plate 11 can be formed separately and then joined between the side plates 12 by some conventional assembly operation. An axle 13 transversely extending at the rear of the main frame 10 has its opposite ends journalled in suitable bearings carried by the side plates 12 and supports for rotation a pair of ground engaging traction wheels 14. A front roller member 15, as best seen in Figure 3, is rotatably supported at the forward or front end of the main frame to rotatably support the same for movement over the lawn. As in manually operated mowers the position of the roller 15 can be vertically adjusted by means similar to those used in conventional mowers.

The wheels 14, as will be shown, are reversibly driven by a small motor 16, preferably gasoline powered, which is supported on the top surface of the bed plate 11. A small tank 17 for holding a supply of gasoline is also mounted on the top surface of the bed plate 11 adjacent the motor 16. Gasoline from the tank 17 is fed to the cylinder or cylinders of the motor through a fuel line indicated at 18 in Figure 2. A shaft 19 driven by the motor 16 extends forwardly therefrom and is supported at its outer end in a suitable bearing 21 fixed to the top surface of the plate 11. A conical friction element 22 formed with a wear-resistant surface is coaxially mounted, as best seen in Figure 2, to the shaft 19 for rotation therewith.

A hub member 23, to which are mounted a pair of spaced bevelled friction disks 24, is splined to a transversely extending shaft 25, the opposite ends of which are journalled in suitable bearings 26 carried by the upper portions of the side plates 12. The disks 24 are preferably formed integral with the hub 23, although it is obvious that these disks may be formed separately from the hub and then coaxially mounted thereto if desired.

A coiled spring 27 sleeving the shaft 25 seats against a collar 28 circumscribing the shaft 25 and adjustably fixed thereto by a set screw 29. The spring 27 exerts a thrust against the hub 23 and normally holds the hub in a position on the shaft 25 in which the rightward disk 24, as viewed in Figure 2, is held in engagement with the conical drive element 22 carried by the motor shaft 19. It should now be obvious that rotation of the motor shaft 19 and the drive element 22 will result in rotation of the rightward disk engaging the drive element 22 to produce rotation of the shaft 25.

The opposite ends of the shaft 25 extend beyond the outer face of the side plates 12 and each carry a pair of pulleys 31 and 32. Continuous belts 33 passed around the pulleys 32 are also passed around relatively large pulleys 34 fixed to the opposite ends of the axle 13 carrying the traction wheels 14. Each belt 33 is adjustably held taut by means of a conventional take-up pulley 35 adjustably mounted to the side plate 12. The motor 16 so drives the shaft 19 that the wheels 14 are driven in a direction to move the mower forwardly as long as the rightward disk 24 is held in engagement with the drive element 22.

A cutting reel 36 is rotatably mounted transversely of the frame 10 at the front edge thereof and cooperates with a fixed cutter bar 37 to cut or mow grass as the wheels 14 drive the mower over the ground. Although not shown, the cutter bar 37 may be adjusted as in conventional lawn mowers to regulate, in connection with the roller 15, the height of the cut of the reel 36. The reel 36 is driven in a manner similar to the wheels 14 for continuous belts 38 are passed over the pulleys 31 and about relatively large pulleys 39 fixed to the opposite ends of the shaft 40 of the cutting reel 36. Take up pulleys 41, adjustably mounted to each side plate 12, are used to hold the belts 38 relatively taut.

Although the spring 27 will normally hold the rightward disk 24 in engagement with the plug 22, means are herein provided for moving the hub 23 to the right, as viewed in Figure 2, to bring about disengagement of the rightward disc with the driving element 22 whenever it is desired to stop forward movement of the mower and to move the leftward disk 24 into engagement with the tapered drive element 22 when it is desired to reverse the mower.

This means, in the now preferred embodiment of the invention, comprises a bell crank lever 42 pivotally mounted to the bed plate 11 of the mower frame. It will be seen, referring now to Figure 3, that the bell crank lever 42 is carried by a cylindrical member 42 telescopically received within a tubular bearing 44 fixed to the top surface of the bed plate 11 by a mounting bracket 45. The mounting bracket 45 carries an upwardly extending arm 46 to which is secured one end of a finger 47, the opposite end of which is rotatably fixed to the cylindrical element 43 carrying the bell crank lever 42.

The one arm of the bell crank lever 42 is formed with a pair of tines 48 which straddle a grooved collar 49 formed as part of the hub 23. The free ends of the tines 48 rotatably carry small bearing members 51 of a width substantially equal to the width of the groove formed in the collar 49. The bearing 51 may comprise, as shown in Figure 5, a ball bearing assembly, the outer race 52 of which is adapted to rotatably engage the opposite walls of the groove of the collar 49.

The opposite arm of the bell crank lever 42 carries a fitting member 53 connected to the one end of a sheathed, flexible shaft 54. The opposite end of the shaft 54 is passed through a bushing 55 fixed in a laterally extending arm 56 carried adjacent the outer end of a handle 57 the inner end of which is fixed to the mower frame 10. This handle is formed with a pair of oppositely extending hand grips 58 which are to be grasped by the hands of the user in steering the mower. The upper free end of the flexible cable 54 is fixed in a chuck-like holding member 59 carried at the lower end of a fitting 60 pendantly supported by a lever 61 pivotally mounted at its inner end to a bracket 62 forming a part of the handle 57.

The sheath of the cable is fixed at its upper end by the bushing 55 and at the lower end by a small clamp member 63 carried by the upper face of the plate 11. Although the sheath of the cable is held against movement, the cable is free to move in the sheath as the arm 61 is pivotally moved.

It will now be seen that if the lever 61 is grasped by the hand of the user and moved toward the hand grip 58 the bell crank lever 42 will be pivotally moved in a clockwise direction and the race 52 will exert a thrust against the one wall of the groove of the collar 49 to longitudinally move the hub 23 to the right, as viewed in Figure 2, to bring about disengagement between the tapered drive element 22 and the rightward disk 24. If the lever 61 is continued to be moved towards the hand grip 58, the hub 23 will be moved to the right a distance sufficient to bring the tapered drive element 22 into engagement with the leftward disk 24. Engagement between the tapered drive element 22 and the leftward disc 24, as will be understood, results in a rotational drive of the shaft 25 in the direction opposite to that resulting from engagement between the drive element 22 and the rightward disk 24, and the wheels 14 consequently will also be driven in the opposite direction to reverse the movement of the mower. Thus in the use of the mower of the present invention when it becomes necessary for the mower to be reversed the user merely grasps the lever 61 and pulls the same towards the hand grip 58 until the drive element 22 and the leftward disk 24 are in engagement.

It has already been pointed out that the lever 62 may be so manipulated as to move the hub 23 to a position in which the drive element 22 is out of engagement with both disks 24. Obviously, the shaft 25 will not be rotatably driven when this occurs and the mower will remain at rest. As it may be desirable or necessary to leave the mower unattended and to obviate the necessity of stopping the motor 16 whenever it is desired to maintain the mower stationary, means are provided for positively holding the hub 23 in the position in which the drive element 22 is not engaging either of the disks 24.

Although this means may take various forms, in the embodiment of the invention illustrated, this means comprises a small locking lever 64 pivotally mounted to the laterally extending arm 56. The lever 64 is formed with a notch 65 which when the lever 64 is swung to the position shown in full lines in Figure 4, partially circumscribes the flexible cable 54 and prevents return of the flexible cable 54 to its normal position as shown in Figure 2. The lever 64 will prevent return of the flexible shaft 54 as the notch 65 is small enough to prevent the chuck 59 from moving downwardly after the chuck moves into engagement with the upper face of the lever 64. Thus, when it is desired to hold the mower against movement, it is only necessary to move the lever 61 to a position in which the bell crank lever 42 has moved the hub 23 to a position in which the drive element 22 engages neither disk 24, and then move the lever 64 until the same moves under the chuck 59. Upon release of the lever 62, although the spring 27 tends to move the hub 23 to the left, as viewed in Figure 2, thus tending to rock the bell crank lever 42 in a counter-clockwise direction to draw the flexible cable 54 downwardly as viewed in Figure 4, the lever 64, as above explained, prevents return of the flexible shaft 54 to its normal position and the motor 16 will now idle without driving the mower. When it is desired to proceed with the mowing, the lever 64 can be moved back to the dotted line position shown in Figure 3 whereupon the spring 27 returns the hub 23 to its normal position in which the rightward disk 24 is drivingly engaged by the drive element 22 and the mower is driven forwardly.

It should now be seen that the mower of the present invention is one which can be used by the average home owner, for the mower, although ordinarily driven in a forward direction, can be by manipulation of the lever 62 brought to a rest or be driven in a reverse direction. It should also be obvious that it would take very little skill to be able to maneuver the mower on even relatively small grass plots in which the direction of travel of the mower is constantly changed.

As the driving mechanism is completely free of all gear elements and clutch mechanisms which are likely to fail in use, particularly by an inexperienced operator, the mower herein shown has a remarkably long service life. Due to the particular arrangement of the disks 24 and the drive element 22, wear occurring at the friction surfaces does not materially affect the operation of the mower, and as the surfaces wear the spring 27 will still maintain good engagement between the drive element 22 and the rightward disk 24. As the collar 28 is adjustably fixed to the shaft 25, the force exerted by the spring can be maintained constant by merely moving the collar 28 to a new position, in which position it will be held by the set screw 29.

Although the now preferred embodiment of the present invention has been shown and illustrated herein, it is to be understood that the invention is not to be limited thereto, for it is susceptible to changes in form and detail within the scope of the appended claims.

I claim:

1. In a power-driven lawn mower for control by a walking operator, which lawn mower has a guiding handle, a prime mover, ground wheels, and a transverse drive shaft operatively connected with said ground wheels, the combination therewith of control means to govern actuation of the drive shaft by the prime mover, said control means comprising: a friction cone operatively connected with said prime mover, said cone extending in a direction transversely of said drive shaft; a pair of beveled friction discs slidingly keyed on said drive shaft in spaced face-to-face positions on opposite sides of said cone, said pair of friction discs being interconnected to move in unison through a range of three positions including a first extreme position with one of said discs in contact with said cone to drive the lawn mower forward, a second extreme position with the other of said discs in contact with said cone to drive the lawn mower rearward and an intermediate neutral position with both discs spaced from said cone, spring means on said shaft urging said pair of discs in the direction away from said second limit position towards said first limit position to drive the lawn mower forward; a bell crank having one arm operatively connected with said pair of discs to shift the discs in the direction from said first limit position to said second limit position in opposition to said spring; a control member mounted adjacent said guiding handle to be included with the guiding handle in the operator's grip, said control member being operatively connected with said bell crank and being movable toward said guiding handle to move said pair of discs in the direction from said first limit position to said second limit position, whereby said spring tends to move the control member away from the guiding handle; and manually operable means near said guiding handle to block movement of said control member at the position corresponding to said neutral position of the pair of discs, whereby the operator may relax his grip on the guiding handle and control member to cause the lawn mower to drive forward, may tighten his grip moderately to disconnect the prime mover from the drive shaft to permit the lawn mower to remain stationary with said prime mover in operation, may manipulate said manually operable means to block the control member at the position disconnecting the prime mover from the drive shaft, and may tighten his grip to greater degree to cause the lawn mower to be driven backwards.

2. In a power-driven lawn mower for control by a walking operator, which lawn mower has a guiding handle, a prime mover, ground wheels, and a transverse drive shaft operatively connected with said ground wheels, the combination therewith of control means to govern actuation of said drive shaft by the prime mover, said control means comprising: a rotary driving element operatively connected with said prime mover, said driving element being positioned with its axis in a direction transversely of said drive shaft; a pair of discs slidingly keyed on said drive shaft in spaced face-to-face positions on opposite sides of said driving element, said pair of discs being interconnected to move in unison through a range of three positions including a first extreme position with one of said discs in contact with said driving element to drive the lawn moved forward, a second extreme position with the other of said discs in contact with said driving element to drive the lawn mower rearward and an intermediate neutral position with both discs spaced from said driving element; spring means on said shaft urging said pair of discs in the direction from said second limit position towards said first limit position; and a control member mounted adjacent said guiding handle to be included with the guiding handle in the operator's grip, said control member being operatively connected with said pair of discs and being movable towards said guiding handle to move said pair of discs in the direction from said first limit position towards said second limit position in opposition to said spring whereby the operator may relax his grip on the guiding handle and control member to cause the lawn mower to be driven forward, may tighten his grip moderately to disconnect the prime mover from the drive shaft and may tighten his grip to greater degree to cause the lawn mower to be driven forward.

3. A lawn mower as set forth in claim 2 which includes: a cable to operatively connect said control member with said pair of discs; means near said guide handle movable into and out of contact with said cable, said movable means having a notch to fit against the cable; and means on said cable for blocking abutment with said movable means when the movable means is in contact with the cable, said means on the cable being positioned thereon to cooperate with said movable means as a stop to limit the movement of said cable in response to said spring at the cable position corresponding to the neutral position of said pair of discs.

FRANK G. SZAGER.

REFERENCES CITED

The following references are of record in the file of this patent:

UNITED STATES PATENTS

| Number | Name | Date |
| --- | --- | --- |
| D. 121,868 | Davis | Aug. 13, 1940 |
| 1,048,498 | Coldwell | Dec. 31, 1912 |
| 1,085,379 | Coldwell | Jan. 27, 1914 |
| 1,160,607 | Housel | Nov. 16, 1915 |
| 1,170,877 | Colwell et al. | Feb. 8, 1916 |
| 1,493,223 | Peters | May 6, 1924 |
| 1,527,595 | McComb | Feb. 24, 1925 |
| 1,657,514 | Miller | Jan. 31, 1928 |
| 1,676,624 | Ulrich | July 10, 1928 |
| 2,076,056 | Woodford | Apr. 6, 1937 |
| 2,247,333 | Funk | June 24, 1941 |
| 2,278,922 | Goodall | Apr. 7, 1942 |
| 2,282,837 | Wahrenbrock | May 12, 1942 |
| 2,401,796 | Raitch | June 11, 1946 |
| 2,429,378 | Steubner | Oct. 21, 1947 |

FOREIGN PATENTS

| Number | Country | Date |
| --- | --- | --- |
| 12057/28 | Australia | Mar. 12, 1929 |